United States Patent Office 2,857,434
Patented Oct. 21, 1958

2,857,434

DIHYDROANTHRACENEDICARBOXALDEHYDES AND PROCESS OF PREPARING

Tad L. Patton, Houston, Tex., assignor to Monsanto Chemical Company, St. Louis, Mo., a corporation of Delaware No Drawing. Application October 4, 1956
Serial No. 613,827

4 Claims. (Cl. 260—599)

This invention relates to a novel synthesis of difunctional compounds, and more particularly provides a novel procedure for the preparation of dialdehydes.

Difunctional compounds are of considerable importance in organic chemistry, particularly for the synthesis of condensation polymers. Thus, for example, polyfunctional alcohols such as ethylene glycol and glycerine, and anhydrides of difunctional acids such as phthalic and maleic, are sold in tonnage quantities for the synthesis of alkyd resins. While polyester resins have been known for a number of years, only more recently has attention been directed to polymeric Schiff bases, which are products of the condensation of polyamines with polyaldehydes. Thus, for example, as described in U. S. Patent 2,352,387, terephthalaldehyde has been condensed with diamines, the fibrous polymer produced having the repeating unit

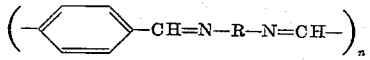

where R is, e. g., —CH$_2$CH$_2$CH$_2$CH$_2$CH$_2$CH$_2$—. Other dialdehydes which have been condensed with diamines include alkylenedioxy-4,4'-dibenzaldehydes and 3,4-dibromothiophenedialdehyde; however, generally terephthalaldehyde has been the dialdehyde most usually studied in such condensations, difunctional aldehydes being only difficultly available by prior art methods.

Aldehyde functions may be introduced onto aromatic rings by forming halomethyl substituents and hydrolyzing these to formyl radicals. Thus, terephthalaldehyde is conveniently prepared by halogenation of p-xylene, followed by hydrolysis. This method, however, is not generally applicable to hydroaromatic or cycloaliphatic and aliphatic hydrocarbons.

In accordance with this invention, hydroaromatic and aliphatic dialdehydes are prepared by forming the Diels-Alder adduct of vinylene carbonate and a diene, hydrolyzing said adduct to the corresponding diol, preferably hydrogenating the adduct to remove any aliphatic unsaturation, and cleaving the diol to form a dialdehyde.

Vinylene carbonate is a cyclic olefin of the formula

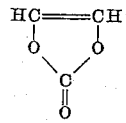

It may be prepared advantageously by the pyrolytic dehydrochlorination of chloroethylene carbonate as described in copending application, Serial No. 399,828, filed December 22, 1953, by T. L. Patton, assigned to the same assignee as the present application.

Vinylene carbonate acts as a dienophile in the Diels-Alder reaction, to form cyclic adducts. Thus, for example, the adduct of 2,3-dimethylbutadiene with vinylene carbonate is described by M. S. Newman at J. Amer. Chem. Soc., 75, 1263-4 (1953). Similarly, vinylene carbonate forms adducts with cyclic dienes such as cyclopentadiene and with hexahalocyclopentadienes, as described, e. g., in copending application Serial No. 510,052, filed May 20, 1955, now U. S. Patent No. 2,799,567, by W. K. Johnson and T. L. Patton, of common assignment herewith. As disclosed in a copending application filed concurrently herewith, Serial No. 613,834, by T. L. Patton and W. K. Johnson, vinylene carbonate has also been found to undergo Diels-Alder adduct formation with tricyclic dienes, exemplified by anthracene, 9-methylanthracene, 9,10-dimethylanthracene, etc.

In accordance with the present invention, as a first step in the synthesis of dialdehydes, vinylene carbonate is contacted with a conjugated diene to form an adduct containing two more rings than the original diene.

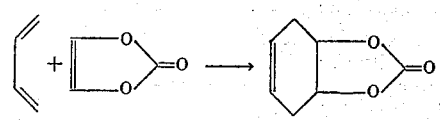

The conditions necessary for adduct formation vary widely, depending on the diene employed. Generally, no catalyst is used in Diels-Alder reactions; the diene and dienophile are simply contacted until adduct formation occurs. The process may be facilitated by application of elevated temperatures, up to below the decomposition temperature of the reaction components; superatmospheric pressures may be applied and/or solvents may be employed to keep the reactants in contact at such temperatures. A polymerization inhibitor such as hydroquinone may be added to the reaction mixture to avoid loss of reactants by polymer formation. The time of reaction is adjusted in accordance with reaction temperatures and ease of adduct formation.

Dienes susceptible of undergoing the present adduct formation as a first step in the synthesis of dialdehydes may be found listed, e. g., in Organic Reactions (R. Adams et al., ed.) vol. IV, pages 1-173, wherein aspects of the Diels-Alder synthesis are reviewed. Particularly preferred in the present process are hydrocarbon and halo-hydrocarbon dienes containing from 0 to 3 five- to six-membered rings. Exemplary of such acyclic dienes undergoing adduct formation are hydrocarbons such as isoprene, butadiene, 2-methyl-1,3-pentadiene, 2,3-dimethylbutadiene, 1,4-diphenylbutadiene; and halogenated hydrocarbons such as chloroprene and bromoprene, etc. Representative of monocyclic dienes which form adducts with vinylene carbonate are cyclopentadiene, hexachlorocyclopentadiene, 5,5-difluoro-1,2,3,4-tetrachlorocyclopentadiene, hexabromocyclopentadiene, etc. Alicyclic compounds wherein the ring unsaturation is conjugated with an extranuclear olefinic bond, such as 1-vinyl-1-cyclohexene, and bicyclic dienes such as 1,1'-bicyclopentanyl, are also capable of adduct formation. Other hydrocarbon and halo-substituted dienes containing 0 to 2 ring structures which may be used in the present process will be found listed in the above-mentioned patent application, Serial No. 510,052, and in the Organic Reactions volume cited above; they are incorporated herein by reference.

When the dienes discussed in the immediately preceding paragraph are used for adduct formation, unsaturated cyclic compounds are formed. Aldehydes are generally relatively mobile compounds, tending, for example, to undergo aldol condensation to form polymeric materials, and the instability of aldehydes is accentuated by the presence of aliphatic unsaturation. Accordingly, in the present process for the synthesis of dialdehydes, a preferred embodiment includes elimination of any olefinic double bonds present in the intermediates utilized, prior to the formation of the ultimate carbonyl compounds.

However, when vinylene carbonate is condensed with an anthracene hydrocarbon in accordance with copending application, Serial No. 613,834, of even date and common assignment herewith, by the present applicant and William K. Johnson, there is obtained an adduct in which the only unsaturation present is aromatic. The structure thereof is represented by the formula

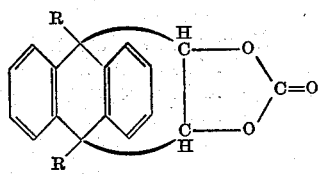

where R is H or a lower alkyl radical. By the hydrolysis and oxidation of such adducts, there are obtained directly, without the requirement of a hydrogenation step, novel dibenzocyclohexanedicarboxaldehydes, free of aliphatic unsaturation and of consequent tendencies to cyclization and addition polymerization. Exemplary of anthracene hydrocarbons which are a particularly preferred class of dienes for the practice of the present invention are anthracene itself, and 9- and/or 10-alkylanthracenes such as 9-methylanthracene, 9,10-dimethylanthracene, 9-isopropylanthracene, 9-amylanthracene, 9,10-di-n-butylanthracene, etc.

As a result of formation of a Diels-Alder adduct with vinylene carbonate in accordance with this invention, there is formed the cyclic carbonate of a diol. As a next step in the present synthesis of dialdehydes, the cyclic ester is hydrolyzed to a diol. The conditions for the hydrolysis vary, depending on the diene utilized in preparing the adduct: thus, for example, while alkaline catalysts are useful for the hydrolysis of anthracene and cyclopentadiene adducts with vinylene carbonate, acid conditions should be employed in the de-esterification of adducts derived from the halocyclopentadienes. Acid and alkaline hydrolysis catalysts useful in the present process include, e. g., mineral acids such as hydrochloric, sulfuric, and phosphoric acids, and organic acids such as toluenesulfonic acid; inorganic bases such as sodium or potassium hydroxides, and organic bases such as quaternary ammonium hydroxides, e. g., choline hydroxide. Where acid hydrolysis is the choice, the hydrolysis reaction is particularly preferably carried out in the presence of a lower alkyl alcohol, such as methanol or ethanol, whereby the dialkyl carbonate formed may be recovered. The acid hydrolysis reaction employing an alcohol may, if desired, be carried out in the presence of water, e. g., in up to 50% aqueous solutions of alcohols. Either acid or alkaline hydrolysis should be carried out in the presence of an ionizing solvent, e. g., water, a lower alkanol such as methanol or ethanol, dioxane, etc. On conclusion of the hydrolysis reaction—which may, if desired, be facilitated by heating, although this is not necessary—the diol is isolated by conventional procedures, i. e., by evaporation, precipitation, etc.

Diols which may be obtained as intermediates in this process—the corresponding cyclic carbonates being the adducts obtained in accordance with the first step of the present method—include monocyclic diols such as 4-cyclohexene-1,2-diol and 4,5-dimethyl-4-cyclohexene-1,2-diol; bicyclic diols such as bicyclo[2.2.1]-5-heptene-2,3-diol, 1,4,5,6,7,7-hexachlorobicyclo-[2.2.1]-5 - heptene-2,3-diol, and 1,4,5,6-tetrachloro-7,7-difluoro-bicyclo[2.2.1]-5-heptene-2,3-diol; and polycyclic diols containing up to four rings, such as 9,10-dihydro-9,10-ethanoanthracene-11,12-diol, 9,10-dihydro-9,10-diethyl-9,10-ethanoanthracene-11,12-diol, and 9(10H)-methyl-9,10-ethanoanthracene-11,12-diol, etc.

In accordance with the present invention, those diols containing aliphatic unsaturation are preferably hydrogenated prior to the formation of dialdehydes therefrom. The hydrogenation step may take place either prior to or after the above-described hydrolysis step; i. e., either the diol or the cyclic carbonate thereof may be subjected to hydrogenation. Any of a variety of reducing agents may be employed in this step; thus, for example, an aliphatically unsaturated cyclic diol may be reduced catalytically by hydrogen gas, in the presence of a catalyst such as, e. g., nickel, palladium, platinum, or copper chromite. In an exemplary procedure, an unsaturated diol prepared from vinylene carbonate in accordance with the invention is dissolved in a solvent, such as ethanol, and placed in a pressure-resistant autoclave, together with a few grams of Raney nickel hydrogenation catalyst. Hydrogen in excess of the theoretical amount necessary to saturate the olefinic bond of the diol is pressed into the autoclave, which is closed and agitated. While heating is not generally necessary with Raney nickel catalysts, the autoclave may be heated if desired to accelerate the hydrogenation; generally, temperatures below 200° C., and preferably, below 100° C. are adequate under ordinary conditions to bring about relatively rapid reaction. The pressure is dependent on temperature, and may vary from 2 to 1000 atmospheres, or greater. When hydrogenation takes place, a decrease in pressure will occur. Isolation of the resulting diol is accomplished, e. g., by evaporation of the solution thereof, from which the catalyst is first filtered.

In the ultimate step of the present process, the diols, obtained as described above, directly from adducts or indirectly from hydrogenation of aliphatic and cycloaliphatic diene adducts, are now converted to the dialdehydes which are the object of the present process. In accordance with the invention, diols prepared as described above are subjected to oxidative cleavage whereby dialdehydes are formed. The presently preferred reagent whereby said oxidative cleavage is accomplished is lead tetraacetate; it has been found that other agents reported in the literature to accomplish the cleavage of diols to aldehydes, such as periodic acid, do not produce an aldehydic product which can be isolated from the present cyclic cis-diols.

Lead tetraacetate is readily prepared by the addition of red lead ($Pb_3O_4$) to a mixture of glacial acetic acid containing about one-fourth its amount of acetic anhydride, preferably in the presence of gaseous chlorine. The resulting reaction mixture is filtered off hot; the precipitate which deposits from the cooled filtrate contains over 90% lead tetraacetate.

In carrying out the present oxidative cleavage, the diol is contacted with approximately an equimolar amount of lead tetraacetate, in an inert organic solvent. Suitable solvents or diluents for the reaction are, e. g., hydrocarbons such as benzene or hexane, chlorinated solvents such as carbon tetrachloride, chloroform, or ethylene dichloride, ethers such as dioxane, etc. The order of addition does not appear to be critical, and either the diol or the acetate may be in excess during the course of the reaction. Anhydrous conditions and an inert atmosphere favor high yields during the cleavage; the reaction mixture may also, if desired, be buffered to neutrality during or after the cleavage, as by addition of a salt such as potassium carbonate or sodium acetate. Generally, cooling is required to moderate the reaction during addition of the one reactant to the other; completion of the cleavage may be assured, if necessary, by heating to moderate temperatures or by stirring the reactants together at room temperature for a period after the addition is complete. While sub- or superatmospheric pressures and other catalytic agents may be applied to the reaction, such measures are generally unnecessary. On completion of the reaction, the solution of the product is filtered off from the catalyst, and evaporated to remove the solvent, after which the dialdehyde may be isolated, e. g., by distillation from higher-boiling polymeric byproducts.

The following examples illustrate some reaction conditions and procedures suitable for the practice of the present process. It will be understood that the invention is not limited to the exact materials and details given therein.

*Example 1*

Vinylene carbonate (86 g., 1.0 mole) is mixed with 66 g. (1.0 mole) of freshly distilled cyclopentadiene in a 300 ml. stainless steel bomb, which is closed and heated for 18–21 hours at 180° C. After cooling, the dark reaction product is treated with a decolorizing carbon and recrystallized from hexane to yield white crystals of bicyclo[2.2.1]-5-hexene-2,3-diol cyclic carbonate, M. 115–117° C., in up to 60% yield.

A solution of 2 g. (0.05 mole) of sodium hydroxide in 50 ml. of water is added to 15.4 g. (0.1 mole) of the vinylene carbonate-cyclopentadiene adduct obtained as described above, and the mixture is refluxed for one hour. Evaporation to dryness under vacuum yields a solid residue which is taken up in three 100 ml. portions of ether, and dried over sodium sulfate. The ether solution is evaporated to yield bicyclo[2.2.1]-5-heptene-2,3-diol, M. 176–178° C., in about 90% yield.

Five grams (0.04 mole) of this diol are dissolved in 100 ml. of ethanol containing 1.0 g. of Raney nickel. The mixture is hydrogenated in a stainless steel, 300-ml. bomb, at 60° C. and 1000 pounds per square inch gauge, for one hour. Evaporation of the filtrate under reduced pressure and recrystallization of the residue from hexane yields 5 g. (86.2% yield) of bicyclo[2.2.1]-heptane-2,3-diol, M. 210–211° C., analyzing as follows:

|  | Found | Calcd. for $C_{17}H_{12}O_2$ |
|---|---|---|
| Percent C | 65.84 | 65.59 |
| Percent H | 9.73 | 9.43 |

Data for hydrogenation carried out similarly at 60° C. are summarized in the following table:

| Olefin, moles | Raney Ni, g. | Pressure, p. s. i. g. | Time, hrs. | Yield, percent |
|---|---|---|---|---|
| 0.09 | 3 | 3,200 | 2 | 90.2 |
| 0.19 | 5 | 1,675 | 2 | 96.7 |

To a solution of 12.8 g. (0.1 mole) of bycyclo[2.2.1]-heptane-2,3-diol in 150 ml. benzene is slowly added, over a period of one hour, with vigorous stirring, 43.4 g. (0.1 mole) of lead tetraacetate. The temperature of the reaction mixture is maintained at 25–30° C., and stirring is continued for 3 hours after the addition is complete. The solution is neutralized to potassium iodide-starch paper by addition of ethylene glycol, and then filtered. After removal of benzene and acetic acid by evaporation under reduced pressure, there is isolated by distillation 7 g. of cyclopentane-1,3-dicarboxaldehyde, B. 77° C./3 mm., $n_D^{25}$ 1.4867; 2,4-dinitrophenylhydrazone, M. 219–220° C.

For comparison, cyclopentane-1,3-dicarboxaldehyde prepared by a different route was isolated as a liquid, B. 130–132°/25 mm., $n_D^{25}$ 1.4853; 2,4-dinitrophenylhydrazone, M. 220–222° C.

Example 2

The adduct of vinylene carbonate with anthracene is prepared by refluxing 43 g. (0.5 mole) of the carbonate with 89 g. (0.5 mole) of anthracene in 250 ml. of o-dichlorobenzene for 45 hours. On cooling, the cyclic carbonate of 9,10-dihydro-9,10-ethanoanthracene-11,12-diol separates as a solid melting, after recrystallization, at 253–254° C.

Ten grams (0.037 mole) of this adduct are mixed with 1.5 g. (0.037 mole) of sodium hydroxide in 200 ml. of equal volumes of water and ethyl alcohol, and the mixture is refluxed for 2 hours. After cooling and removal of the alcohol under reduced pressure, the product precipitates as a flocculent white solid. Treatment with decolorizing carbon and recrystallization from hexane-toluene yields essentially pure 9,10-dihydro-9,10-ethanoanthracene-11,12-diol, M. 203° C.

Lead tetraacetate (13.2 g., 0.042 mole) is added slowly to a solution of 10 g. (0.042 mole) of this dihydroanthracenediol in 150 ml. of benzene and 50 ml. of acetic acid, while the temperature of the mixture is held at 25–30° C. The mixture is stirred for 1 hour after completion of the addition, and then lead acetate is extracted with 100 ml. of water. After removal of the benzene, there are obtained 6.4 g. (64% yield) of 9,10-dihydroanthracene-9,10-dicarboxaldehyde, as small orange needles melting, after recrystallization, at 235–238° C.

Example 3

In another preparation, a mixture of 0.05 mole of 9,10-dihydro-9,10-ethanoanthracene-11,12-diol, 150 ml. of toluene, and 50 ml. of glacial acetic acid was treated with small portions of lead tetraacetate until a total of 0.05 mole of the lead salt had been added. The temperature was maintained at 25–30° C. by intermittent cooling. After stirring for another hour, the solution was reduced to a volume of 50 ml. On standing, a bright orange solid precipitated; this was separated by filtration and recrystallized from glacial acetic acid to yield 9,10-dihydroanthracene-9,10-dicarboxaldehyde as red-orange needles, M. 235–238° C. (percent C: found, 81.55; calcd., 81.33). Infrared data confirm the identification of this product as a formylated hydroaromatic compound.

A mixture of 1.0 g. of the dicarboxaldehyde, 1.0 g. of hydroxylamine hydrochloride, 5 ml. of pyridine, and 10 ml. of dry ethanol was refluxed 2 hours. After cooling, addition of 50 ml. of water precipitated the dioxime of 9,10-dihydroanthracene-9,10-dicarboxaldehyde; after recrystallization from water and dioxane, the dioxime melted at 254° C. and analyzed as follows:

|  | Found | Calcd. for $C_{16}H_{14}N_2O_2$ |
|---|---|---|
| Percent C | 72.77 | 72.16 |
| Percent H | 5.01 | 5.29 |
| Percent N | 9.77 | 10.51 |

Example 4

Similarly, the adduct of vinylene carbonate with butadiene is hydrolyzed and hydrogenated to cyclohexane-1,2-diol, which is oxidized by lead tetraacetate to adipaldehyde, B. 68–70° C./3 mm.

Example 5

An adduct is prepared by refluxing equimolar quantities of vinylene carbonate and hexachlorocyclopentadiene in o-dichlorobenzene for 4 hours. The solvent is removed by distillation to leave solid 1,4,5,6,7,7-hexachlorobicyclo[2.2.1]-5-heptene-2,3-diol cyclic carbonate, melting at 232–233° C. after recrystallization from hexane.

A mixture of 147.6 g. of this adduct and 10 ml. of conc. (28%) hydrochloric acid in 1000 ml. of a 2:3 water-ethanol mixture is refluxed for 16 hours. The reaction mixture is neutralized with sodium acetate and the ethanol removed under reduced pressure. The diol separates as an oil; decolorization with charcoal and recrystallization from ether yields 1,4,5,6,7,7-hexachlorobicyclo[2.2.1]-5-heptene-2,3-diol as white needles, M. 240° C.

A solution of this diol in ethanol containing a catalytic amount of Raney nickel is pressured with hydrogen in a bomb, which is sealed and heated at 60° C. for 2 hours, to give the corresponding saturated diol. On treatment of the aliphatically saturated diol with lead tetraacetate in accordance with the above-described procedure, there is obtained 1,2,2,3,4,5-hexachlorocyclopentane-1,3-dicarboxaldehyde.

By a parallel series of steps, from 1,2,3,4-tetrachloro-5,5-difluorocyclopentadiene is prepared 1,3,4,5-tetrachloro-2,2-difluorocyclopentane-1,3-dicarboxaldehyde.

Similarly, from 6-methyl-1-vinylcyclohexene, including hydrogenation as one of the process steps, there may be prepared 2-formyl-6-methylcyclohexanepropionaldehyde. The hydrogenation step is unnecessary in the conversion, e. g., of 9,10-dimethylanthracene to 9,10-dihydro-9,10-dimethylanthracene-9,10-dicarboxaldehyde in accordance with the present process.

So far as I am aware, the 9,10-dihydroanthracene-9,10-dicarboxaldehydes, of the formula

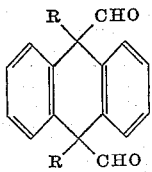

where R is H or a lower alkyl radical, are new compounds. In addition to their utility for the synthesis of polymers, they are also useful chemical intermediates. Thus, for example, by chlorination they are converted to the corresponding carbonyl chlorides, which are useful for a variety of applications. In addition to applications as chemical intermediates, the dihydroanthracenedicarbonyl chlorides afforded by this synthesis are active as biological toxicants. Thus, e. g., 9,10-dihydroanthracene-9,10-dicarbonyl chloride, incorporated in nutrient agar at a concentration of 1 part per thousand, inhibits growth of *Salmonella typhosa* and *Micrococcus pyogenes* var. *aureus* spores implanted thereon.

While the present invention has been described with reference to particular preferred embodiments thereof, it will be understood that variation from the details given herein can be effected without departing from the invention in its broadest aspects.

What is claimed is:

1. The method which comprises subjecting the adduct of vinylene carbonate with an anthracene hydrocarbon, of the formula

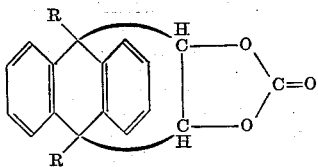

where R is selected from the class consisting of hydrogen and lower alkyl, to hydrolyzing conditions whereby the corresponding 1,2-diol is formed, and subjecting said diol to oxidative cleavage, thereby forming a hydroaromatic dialdehyde of the formula

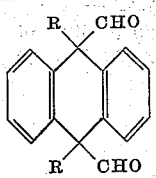

where R is as defined hereinabove.

2. The method of claim 1, wherein R is hydrogen, and the said 1,2-diol is oxidatively cleaved to 9,10-dihydroanthracene-9,10-dicarboxaldehyde by means of lead tetraacetate.

3. The dihydroanthracenedicarboxaldehydes of the formula

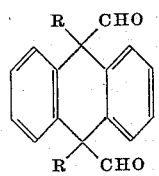

where R is selected from the class consisting of hydrogen and lower alkyl.

4. 9,10-dihydroanthracene-9,10-dicarboxaldehyde.

References Cited in the file of this patent

English et al.: J. Am. Chem. Soc., 71, 3310–1 (1949).
Wagner et al.: Synthetic Organic Chemistry, New York, N. Y., 1953, pp. 158 and 169 relied on.